United States Patent [19]

Cole

[11] Patent Number: 4,870,541
[45] Date of Patent: Sep. 26, 1989

[54] SHIELDED BAR-CAP

[75] Inventor: Michael Cole, Colorado Springs, Colo.

[73] Assignee: Ford Micro Electronics, Colorado Springs, Colo.

[21] Appl. No.: 133,912

[22] Filed: Dec. 16, 1987

[51] Int. Cl.⁴ .................... H01G 4/38; H01L 27/02
[52] U.S. Cl. ..................................... 361/328; 357/51
[58] Field of Search ............... 361/274, 275, 328, 329, 361/330; 357/51

[56] References Cited

U.S. PATENT DOCUMENTS

| 2,777,110 | 1/1957 | Kodama | 361/275 X |
| 3,210,620 | 10/1965 | Lin | 357/51 X |
| 3,265,905 | 8/1966 | McNeil | 357/51 X |
| 3,614,554 | 10/1971 | Shield et al. | 357/51 |

FOREIGN PATENT DOCUMENTS 38274 4/1978 Japan ..................... 357/51

Primary Examiner—Donald A. Griffin
Attorney, Agent, or Firm—Antonelli, Terry & Wands

[57] ABSTRACT

Interelectrode parasitic capacitance coupling between the top plates of a bar-cap is avoided by a shielding electrode layer on the top surface of the bar-cap's ceramic substrate adjacent to, but spaced apart from, each of the top plates. The shielding layer has a plurality of windows through which respective surface regions of the top surface of the bar-cap are exposed. Within the windows respective ones of the top plates of the capacitors of the bar-cap are provided, each plate being spaced apart from the shielding layer. The shielding layer is coupled to a source of reference potential (ground) so as to provide an electrical shield around each of the top plates of the capacitors and thereby effectively prevent parasitic capacitive coupling through the ceramics substrate between adjacent ones of the top plates. Grounding of the shielding layer may be accomplished by a direct wire connection to the shielding layer or by forming a conductive layer along a sidewall of the ceramic substrate to integrally electrically join the shielding layer to a bottom conductor. In a second embodiment of the invention, isolation between adjacent decoupling capacitors of the bar-cap is effected by forming respective grooves or channels between surface regions of the substrate in which the capacitor top plates are formed, thereby interrupting the continuity of the surface of the ceramic substrate and preventing the establishment of a parasitic capacitance between neighboring plates of the bar-cap.

2 Claims, 2 Drawing Sheets

SHIELDED BAR-CAP

FIELD OF THE INVENTION

The present invention relates in general to microminiaturized circuit devices and is particularly directed to a mechanism for shielding the respective capacitor elements of a monolithic decoupling/bypass capacitor array (bar-cap).

BACKGROUND OF THE INVENTION

Decoupling/bypass capacitors are employed in a variety of signal processing applications such as telecommunications, instrumentation, computers, and integrated circuits in general. Typically, because of the size limitations on the packaging of these systems and components, such capacitor elements are housed in a monolithic structure having a size and shape that is readily adaptable to a broad spectrum of circuit mounting configurations. One such configuration, commonly termed a bar-cap, shown diagrammatically in FIG. 1, contains an array 10 of capacitor elements 11-1, ..., 11-N integrated into a ceramic strip 12 that readily lends itself to attachment to a number of different structures and devices including reduced size packaging elements such as leadless chip carriers, as diagrammatically depicted in FIG. 2. As shown therein, because of its very small dimensions (a width W on the order of 0.02–0.04", a length L on the order of 0.06–0.125" and a thickness T on the order of 0.007") one or more (e.g. a pair 21 and 22 being shown in FIG. 2) bar-caps can be situated immediately alongside a semiconductor chip 23, so as to facilitate minimum distance connections between conductors on the chip and top plates 15 of respective capacitors of the barcaps 21,22.

Now, even though a bar-cap configuration offers a microminiaturized packaging design that has gained wide acceptance from a standpoint of its small size and integration density, as the bandwidths and signal processing speeds of circuit components and systems continue to increase, its operation and, consequently, its useful performance as a bypass/coupling element become impacted by the presence of parasitic capacitive coupling through the ceramic substrate between the top plates of the respective capacitor elements of the bar-cap.

More particularly, with reference to FIG. 3 there is diagrammatically illustrated a side view of a typical physical configuration of a bar-cap together with electrical circuit equivalents of the components the bar-cap is intended to provide. As shown therein, for an exemplary six capacitor bar-cap array, a ceramic substrate 31 has a first surface 32 on which are distributed a plurality (six) of first or top plate electrodes 33-1, ..., 33-6 and a second or bottom surface 34 on the entirety of which a reference plane conductor layer 35 is formed. Through the medium of the ceramic substrate a plurality of capacitors 41-1, ..., 41-6 are monolithically integrated within the bar-cap between top electrodes 33 and bottom electrode 35. The bar-cap is normally attached to an associated packaging structure such that layer 35 is mounted atop a ground plane conductor. Also schematically illustrated in FIG. 3 are a plurality of parasitic interelectrode capacitors 45 that are formed in upper surface regions of the substrate 31 between respective ones of the top electrode segments 33. For high bandwidth - high signal processing speed applications and materials (e.g. GaAs), these interelectrode capacitances may circumvent the intended decoupling of the elements of the bar-cap and actually intercouple signal lines to which the top electrodes are connected, thereby defeating the effectiveness of the bar-cap.

SUMMARY OF THE INVENTION

In accordance with the present invention, the interelectrode parasitic capacitance problem described above is obviated by a new and improved monolithic capacitor array structure that effectively electrically isolates the respective capacitors of the bar-cap from one another while still providing the intended capacitive function between the top electrodes and the bottom reference electrode. For this purpose, pursuant to a first embodiment of the invention, a shielding electrode layer is formed on the top surface of the ceramic substrate adjacent to, but spaced apart from, each of the top electrodes of the bar-cap. Preferably this shielding layer is formed as a single layer having a plurality of apertures or windows through which respective surface regions of the top surface of the bar-cap are exposed. Within these windows respective surface regions of the top electrodes of the respective capacitors of the bar-cap are provided, each electrode being spaced apart from the shielding layer. The shielding layer is coupled to a source of reference potential (ground) so as to provide an electrical shield around each of the top electrodes of the capacitors and thereby effectively prevent the generation of parasitic capacitive coupling through the ceramic substrate between adjacent capacitor element top electrodes. Grounding of the shielding layer may be accomplished by a direct wire connection to the shielding layer or by forming a conductive layer along a sidewall of the ceramic substrate to integrally electrically join the shielding layer to the bottom conductor.

In accordance with a second embodiment of the invention, isolation between adjacent decoupling capacitors of the bar-cap is effected by forming respective grooves or channels between surface regions of the substrate in which the capacitor top electrodes are formed, thereby interrupting the continuity of the surface of the ceramic substrate and preventing the establishment of a parasitic capacitance between neighboring electrodes of the bar-cap.

DETAILED DESCRIPTION

Figure 1:
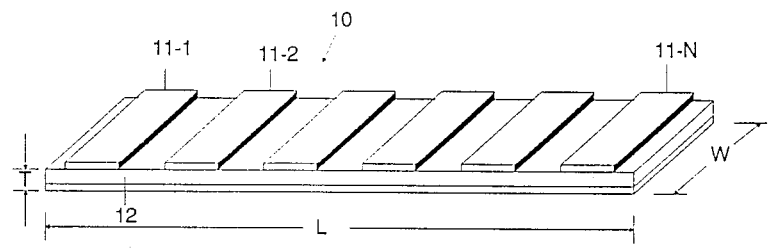
FIG. 1 is a diagrammatical illustration of a conventional bar-cap which contains an array of capacitor elements integrated into a ceramic strip.
Figure 2:
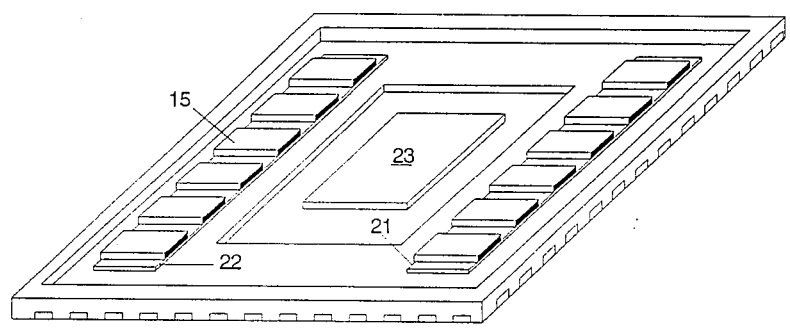
FIG. 2 diagrammatically illustrates a plurality of bar-caps mounted adjacent an integrated circuit chip on a leadless chip carrier.
Figure 3:
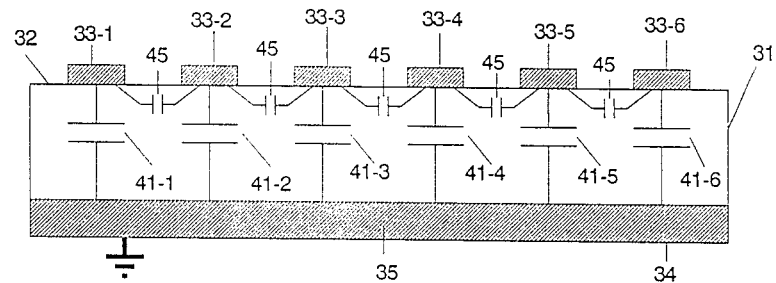
FIG. 3 diagrammatically illustrates a side view of a conventional bar-cap together with electrical circuit equivalents of the components of the bar-cap.
Figure 4:
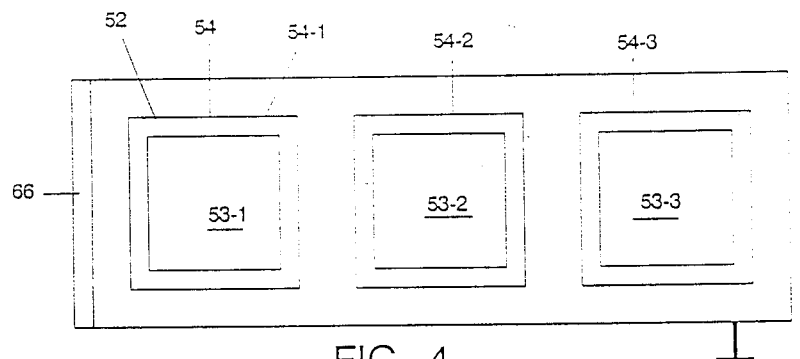
FIGS. 4 and 5 are respective plan and side views of a first embodiment of a shielded bar-cap in accordance with the present invention.
Figure 5:
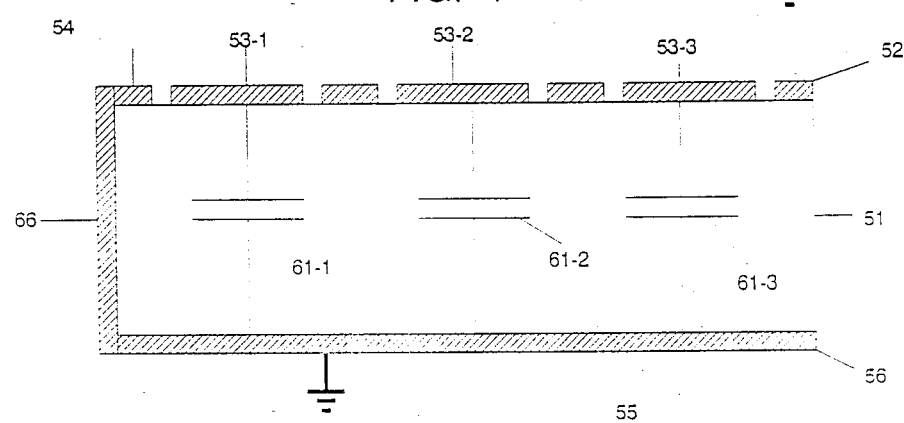

Referring now to FIGS. 4 and 5, a first embodiment of a shielded bar-cap in accordance with the present invention is illustrated as comprising a ceramic substrate 51 having a top surface 52 and a bottom surface 55, substrate 51 being of substantially the same size and dimensions of the substrate of a conventional bar-cap, described above. Distributed on the top surface 52 of ceramic substrate 51 are a plurality of first electrode layers 53-1, 52-2 and 53-3 which form respective top plates of a set (three in the example shown) of capacitors 61-1, 61-2 and 61-3 (shown schematically in ceramic substrate 51), a common bottom plate of which is provided by way of a continuous electrode layer 56 that is contiguous with the entirety of bottom surface 55 of substrate 51. Simply put, what has been described thus far is substantially the same as a conventional bar-cap configuration. However, in accordance with the present invention, on the top surface 52 of substrate 51 there is provided an additional electrode layer 54 in which are formed a plurality of apertures or windows 54-1, 54-2 and 54-3 exposing respective surface regions on which the top plates 53-1, 53-2 and 53-3 of capacitors 61-1, 61-2 and 61-3, respectively, are formed. As shown in FIG. 4 the respective edges of windows 54-1, 54-2 and 54-3 are spaced apart from the edges of top plates 53-1, 53-2 and 53-3, respectively, so as to electrically isolate plates 53 from electrode layer 54.

As explained briefly above, by connecting additional electrode layer 54 to a prescribed source of reference potential (e.g. grounded in common with bottom late 56), layer 54 becomes a shielding electrode through which each of capacitors 61 is effectively electrically isolated from adjacent capacitors of the bar-cap. As a consequence, the grounded electrode layer provides a mechanism for enhancing the protection of circuit components from signal anomalies including adjacent signal bus transients and power bus noise that might otherwise occur at today's higher bandwidths and with the use of semiconductor materials, such as GaAs, that are capable of operating at higher signal processing speeds and are inherently more sensitive to such anomalous conditions.

The manner in which shielding electrode 54 is effectively grounded may take a number of different forms, such as direct wire bonding of the electrode to the same reference conductor (ground plate) to which bottom electrode 56 is connected (e.g. a contiguous metallic plate) or forming a conductive layer along a side surface of ceramic substrate 51 so as to be contiguous with each of shielding electrode layer 54 and bottom (ground plane) layer 46, as shown at 66 in FIGS. 4 and 5. It should also be noted that the benefits of the present invention can be attained without forming the shielding electrode as a layer which surrounds each of top plates 53 in the manner shown in FIGS. 4 and 5. The shielding electrode may be formed as individual stripes (each of which is separately grounded) or in a comblike configuration with the fingers of the comb extending on the top surface 52 of substrate 51 between capacitor plates 53. However, the use of a shielding electrode layer configured as shown in FIGS. 4 and 5 is preferred, as it ensures maximum electrical isolation of the respective capacitors of the bar-cap from one another and facilitates grounding of the shielding electrode.

Figure 6:
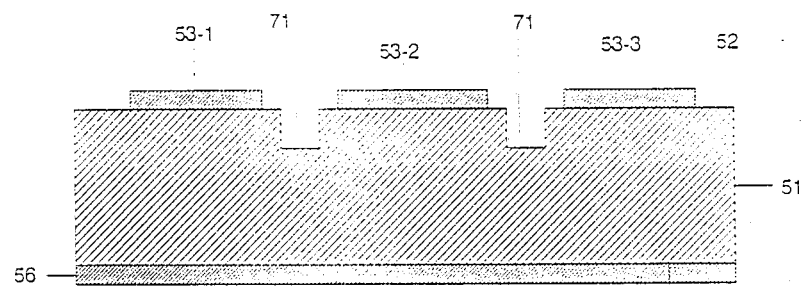
FIG. 6 illustrates a second embodiment of the present invention wherein isolation between adjacent capacitors of the bar-cap is accomplished by respective grooves in the top surface of the bar-cap substrate.

FIG. 6 illustrates another embodiment of the present invention wherein, rather than provide shielding between adjacent capacitors of the bar-cap by way of additional grounded electrode portions which extend between the respective top plates of the capacitors, shielding is accomplished by forming respective grooves or channels 71 in the top surface 52 of substrate 51 between adjacent top plates 53-1 and 53-2 and between adjacent top plates 53-2 and 53-3, respectively. The width and depth of each of grooves 71 will depend on the parameters of the components of the bar-cap and are selected, so as to effectively increase the separation distance through the ceramic substrate between adjacent plates 53, whereby the respective capacitors of the bar-cap are sufficiently electrically isolated form one another by virtue of the lengths of the paths of the elongated or increased physical separations.

As will be appreciated from the foregoing description, the shielded bar-cap configuration in accordance with the present invention provides an effective mechanism for circumventing the problem of mutual coupling between adjacent top plates of a conventional bar-cap by means of structure that effectively electrically isolates the respective capacitors of the bar-cap from one another, while still providing the intended capacitive function between the top electrodes and the bottom reference electrode. As a consequence, the shielded bar-cap is able to offer the microminiaturized packaging design of a conventional bar-cap, without suffering a performance penalty at higher bandwidths and signal processing speeds.

It should also be noted that while the foregoing discussion of the invention has been directed to a bar-cap containing a linear capacitor arrangement, the present invention is also applicable to bar-cap configurations comprised of two-dimensional arrays of capacitors elements, such as a rectangular capacitor array. In this latter instance, the shielding mechanism of the present invention forms a grid-like structure among the respective capacitor elements of the array.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed is:

1. A monolithic multicapacitor device comprising:
a dielectric substrate having top and bottom surfaces;
a first electrode layer contiguous with said bottom surface of said substrate;
a plurality of second electrode layers spaced apart from one another and contiguous with the top surface of said substrate and forming, together with said substrate and said first electrode layer, a plurality of capacitors a first terminal of each of which corresponds to said first electrode layer and second electrodes of respective ones of which correspond to respective ones of said second electrode layers; and
a shielding electrode layer contiguous with said top surface of said substrate so as to extend between, but be spaced apart from, said second electrode layers, said shielding electrode layer, when coupled to a source of reference potential, effectively shielding adjacent ones of said capacitors from one another and thereby preventing the intercoupling of signals between capacitor elements, and wherein said shielding electrode layer is formed of a continuous electrode layer having a plurality of apertures therein, contiguous with said top surface of said dielectric substrate such that said apertures expose surface regions of said substrate on which respective ones of said electrode layers are disposed.

2. A monolithic multicapacitor device comprising:
a dielectric substrate having top and bottom surfaces;
a first electrode layer contiguous with said bottom surface of said substrate;
a plurality of second electrode layers spaced apart from one another and contiguous with the top surface of said substrate and forming, together with said substrate and said first electrode layer, a plurality of capacitors a first terminal of each of which corresponds to said first electrode layer and second electrodes of respective ones of which correspond to respective ones of said second electrode layers;
a shielding electrode layer contiguous with said top surface of said substrate so as to extend between, but spaced apart from, said second electrode layers, said shielding electrode layer, when coupled to a source of reference potential, effectively shielding adjacent ones of said capacitors from one another and thereby reducing the intercoupling of signals between capacitor elements, said shielding electrode layer being formed of a plurality of electrodes disposed on said top surface of said dielectric substrate, respective ones of which extend between adjacent second electrode layers, said plurality of electrodes and said first electrode layer being adapted to be coupled to a common source of reference potential.

* * * * *